March 3, 1970  B. LEE  3,498,278

AUTOMOBILE ENGINE COOLING SYSTEM

Filed April 18, 1968

INVENTOR
BERT LEE

BY Laurence R. Brown
ATTORNEY

United States Patent Office
3,498,278
Patented Mar. 3, 1970

3,498,278
AUTOMOBILE ENGINE COOLING SYSTEM
Bert Lee, Salt Lake City, Utah, assignor of one-third each to Jefferson D. Morgan, Enid, and David Morgan, Blackwell, Okla.
Filed Apr. 18, 1968, Ser. No. 722,415
Int. Cl. F01p 3/20, 11/02, 11/20
U.S. Cl. 123—41.51       7 Claims

ABSTRACT OF THE DISCLOSURE

For use with a liquid cooled combustion engine circulation system having a cooling radiator, a pressure expansion tank partially filled with a compressible medium such as air is provided for coupling into the system to receive liquid coolant at a lower temperature position. Thus, the partial charge of the coolant liquid can expand and contract with engine operation against the charge of compressible medium. The expansion tank has a one way air inlet valve and the cooling system has a one way pressure relief valve.

---

This invention relates to combustion engine cooling systems, and more particularly, it relates to circulation of liquid coolants through automobile radiators.

In automotive cooling systems several problems exist which limit the efficiency of the cooling. Inevitably, losses of water occur in systems that are not sealed, eventually resulting in mixtures of air or stream or insufficient capacity to circulate and cool properly. Liquid coolant losses occur because of evaporation and leakage, but more often because of overflow occurring through the pressure outlet valve usually located in the radiator cap. This results when overheating takes place during idling or when steam is generated at hot spots or pockets and builds up pressure in the circulation system. Also, overflow can occur during sudden surges of power when the water pump speed accelerates such as occurring after idling when an automobile is moved. With reasonable acceleration, the water pump may send a shock through the circulation system temporarily exceeding the pressure limit and forcing water out the overflow pressure valve.

In general, excessive heating even under temporary conditions will cause rapid engine deterioration and should be avoided by proper circulation at all times without creation of steam or air pockets, loss of water or exceeding the system pressure rating.

Most automotive cooling systems have little flexibility in their range of operation, tolerating little variation of pressure, temperature, coolant expansion or water loss. Thus, when an engine is cold, the liquid coolant contracts and tends to draw air into the circulation path. When it heats and expands it tends to force water out of the overflow pressure valve. If pressure changes such as by different pumping velocities at the same time as temperatures change, the ranges of variation are greater. As air or steam gets mixed into the system, loss of cooling capacity results, and circulation problems develop. Thus, there is a very narrow range of optimum operating conditions available for a conventional automotive liquid coolant cooling system.

It is therefore an object of the invention to improve automotive cooling systems.

Another object of the invention is to provide a circulating liquid cooling system for combustion engines that eliminates the aforesaid disadvantages.

A further object of the invention is to provide an automotive engine cooling system which is simple yet effective in attaining cooling efficiency while reducing chances for loss of the liquid coolant.

Yet another objective of the invention is to provide a circulating cooling system which is self regulating over a large range of temperature, shock and steam conditions.

Therefore in accordance with this invention there is provided an auxiliary pressure tank water reservoir coupled into the cooling system at a lower water temperature position. The tank is partly filled with compressible air and partly filled with water to thereby conform automatically with wide ranges of temperature, water expansion and pressure conditions within the cooling system. This results in a self regulation system which runs cooler with maximum cooling efficiency, avoids water losses, and avoids steam or air pockets even under idling conditions.

Further features, objects and advantages of the invention will be found throughout the following detailed description, which refers to the accompanying drawings, wherein.

Figure 3:
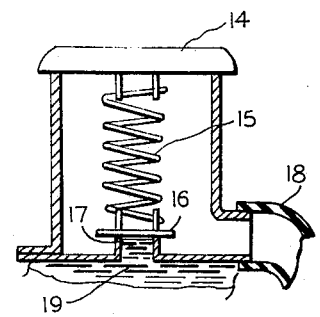
FIGURE 3 is an elevation view, partly in section, of a radiator cap pressure relief valve as used in this invention.
Figure 4:
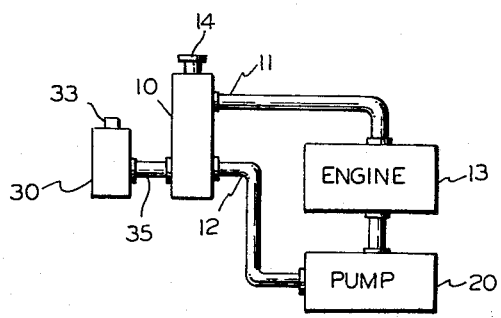
FIGURE 4 is a schematic view of a combustion engine cooling system.

In the drawings, a conventional automobile radiator 10 is shown with connections 11 and 12 for coupling respectively to the hot and cold flow connections of the liquid cooled internal combustion engine 13 shown schematically in FIGURE 4. A radiator cap 14 is provided with an internal pressure relief valve mechanism as shown in FIGURE 3. Thus, typically a spring 15 holds valve plate 16 against the seat 17 to prevent discharge until pressure exceeds a predetermined level such as fourteen pounds per square inch. A greater pressure permits overflow into the cap area and out a discharge path provided such as by hose 18. In the circulation system forced circulation is provided by means of a water pump 20 generally having a rotational speed dependent upon engine speed, and thus circulating water or other coolant liquid at a rate proportional to engine speed.

In accordance with this invention an auxiliary tank 30 is provided, which physically may be separately mounted for coupling with a standard radiator or cooling system as an added unit after automobile manufacture, or which could be integrated as a separate part of a radiator unit construction in original equipment.

Figure 1:
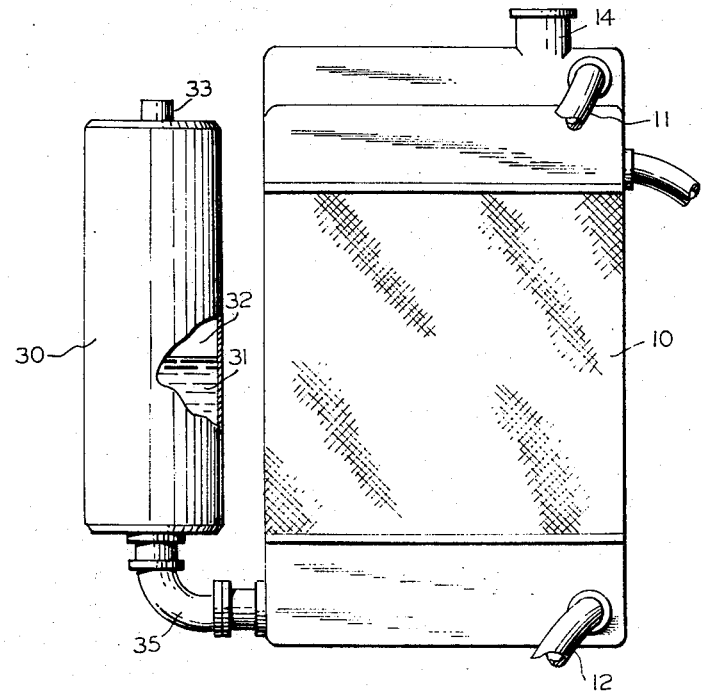
FIGURE 1 is an elevation view, partly in section, of a typical automobile radiator installation of the invention.
Figure 2:
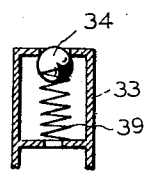
FIGURE 2 is an elevation view, partly in section, of an air inlet valve used in accordance with this invention.

This tank is partly filled with water 31 and partly with air, 32 or some other compressible medium and is vertically oriented with a valve 33 at the top to only let air in but to prevent escape of air. This construction might be as shown in FIGURE 2 with a ball 34 seated in an opening by means of a weak spring 39. Thus, when pressure within the tank 30 falls below atmospheric by enough to overcome the pressure of spring 39, the tank may receive air from the atmosphere.

A coupling joint 35, which may have a limited throat as hereinafter discussed, is made at a position communicating with lower temperature coolant such as at the bottom of radiator 10. This permits pressure variations within the cooling system to be absorbed by the air 32 in tank 30 as the non-compressible water expands and contracts with temperature changes and other peculiarities of an automotive type cooling system.

In operation, the valve 33 automatically establishes appropriate pressure within the tank 30 when the cooling system is filled, and adjusts to changes in operation conditions such as caused by some leakage of water from the cooling system, through pressure relief valve 14, for example. It has been found that the cooling system operates well when the volume of tank 30 is chosen to displace about ⅛ pint of coolant for every gallon of cooling system capacity in a cool engine when the system is filled. The air pressure at 32 will then vary with cooling system performance and will increase as engine heat causes an expansion of water. Such good regulation occurs under normal automobile operating conditions that no water need be lost through cap 14 and thus a sealed cooling system can practically be produced with optimum self regulating performance over a wide range of engine operating conditions.

Consider operation under some of the conditions encountered as exemplary. If an engine is idling perhaps water pressure under circulation by pump 20 will be about 8 p.s.i. If the engine is accelerated quickly as in a fast start from this condition, the water pump may temporarily insert a shock wave of about 12 p.s.i. additional pressure, thus adding to a 20 p.s.i. condition exceeding normal maximum safety pressure for the system and forcing the pressure escape valve to open and discharge water through hose 18. Thus, the optimum quantity of water and maximum efficiency of cooling can be retained by the use of tank 30, which absorbs this shock and prevents water loss. For purpose of integrating or throttling short term variations without excessive flow of liquid in and out of tank 30, the coupling pipe 35 may have a reduced throat.

Also, with normal expansion cycles of the water during heating and cooling of the engine, in prior systems, a considerable air volume is encountered at the top of the radiator, which interferes with smooth circulation and prevents optimum cooling. By use of tank 30, the liquid level 19 as shown in FIGURE 3 can completely fill the radiator, since the variations of pressure are taken up in compression of air 32 in tank 30. It has been found, for example, that an engine prone to overheat while idling can even be put under load such as an air conditioner with this system and run at normal water temperatures over long periods of time on a hot day.

Other variations which lessen cooling efficiency are corrected by this invention, including the tendency to create pockets of steam within the engine block cooling jacket which prevent efficient transfer of heat. The cooling liquid can be circulated with less turbulence and without occasional circulating air or steam pockets. These conditions in turn cause pressure variations which in conventional systems would cause losses of coolant through hose 18, but which can be absorbed through action of the tank 30.

What is claimed is:

1. For installation in a combustion engine cooling system with circulating liquid coolant such as water including a cooling radiator, a closed circulation system for passing the coolant through the engine and the radiator and pressure outlet means normally retaining coolant in the system but permitting discharge after a predetermined maximum pressure is attained, the improvement comprising a pressure absorption tank adapted for coupling into the system at a position receiving only the liquid coolant at a reduced temperature and retaining therein a partial capacity of a compressible medium such as air, to thereby permit expansion and contraction of the coolant in said system while changing pressure of the compressible medium during heating and cooling cycles of the liquid coolant when the engine is run, idled and stopped.

2. A system as defined in claim 1, wherein the radiator has its cooler temperature at the bottom and the pressure tank has a coupling to the circulation system at the bottom of the radiator.

3. A system as defined in claim 1, wherein the pressure tank has a volume providing an accumulation of liquid in said tank of the order of one part to every fifty of liquid in said circulation system.

4. A system as defined in claim 1, wherein the pressure tank comprises a closed tank having an inlet valve at the top for permitting air to enter but not leave the tank and coupling members at the bottom for connection with said circulation system.

5. A system as defined in claim 2, wherein a removable liquid inlet part is provided in the circulation system, and the pressure tank is connected in the circulation system with its coupling members and volume so dimensioned with respect to the liquid capacity of said circulation system that liquid can be added to fill said circulation system to its capacity and simultaneously fill said pressure tank partly with said liquid.

6. A system as defined in claim 2, including a fluid pump in said system forcibly circulating the coolant liquid at a circulation rate dependent upon the speed of the engine to thereby fluctuate the amount of liquid coolant in said pressure tank as fast changes in engine speed occur.

7. A system as defined in claim 6, including a throttling restriction in said coupling members for controlling the rate of flow of liquid coolant between said circulation system and said pressure tank.

References Cited

UNITED STATES PATENTS

| 1,167,151 | 1/1916 | Chatain | 123—41.51 |
| 1,632,994 | 6/1927 | Burgess | 123—41.51 XR |
| 2,878,794 | 3/1959 | Stromberg | 123—41.5 XR |
| 3,139,073 | 6/1964 | White et al. | 123—41.5 XR |
| 3,158,140 | 11/1964 | Peras | 123—41.51 |
| 3,265,048 | 8/1966 | Herbon | 123—41.51 |

MARK M. NEWMAN, Primary Examiner

U.S. Cl. X.R.

123—41.5